US009563656B2

(12) United States Patent
Castellani et al.

(10) Patent No.: US 9,563,656 B2
(45) Date of Patent: Feb. 7, 2017

(54) METHOD AND SYSTEM TO GUIDE FORMULATIONS OF QUESTIONS FOR DIGITAL INVESTIGATION ACTIVITIES

(75) Inventors: Stefania Castellani, Meylan (FR); Nikolaos Lagos, Grenoble (FR); Maria Antonietta Grasso, Grenoble (FR); Frederic Roulland, Le Versoud (FR); Nicolas Hairon, Grenoble (FR)

(73) Assignee: XEROX CORPORATION, Norwalk, CT (US)

( * ) Notice: Subject to any disclaimer, the term of this patent is extended or adjusted under 35 U.S.C. 154(b) by 1513 days.

(21) Appl. No.: 12/781,299

(22) Filed: May 17, 2010

(65) Prior Publication Data

US 2011/0282892 A1 Nov. 17, 2011

(51) Int. Cl.
G06F 17/00 (2006.01)
G06F 17/30 (2006.01)

(52) U.S. Cl.
CPC .............................. G06F 17/30389 (2013.01)

(58) Field of Classification Search
CPC ................................................ G06F 17/30389
See application file for complete search history.

(56) References Cited

U.S. PATENT DOCUMENTS

| 6,263,335 | B1 | 7/2001 | Paik et al. | |
|---|---|---|---|---|
| 6,601,026 | B2* | 7/2003 | Appelt et al. | 704/9 |
| 7,058,567 | B2 | 6/2006 | Aït-Mokhtar et al. | |
| 7,152,064 | B2* | 12/2006 | Bourdoncle et al. | |
| 2007/0179776 | A1 | 8/2007 | Segond et al. | |
| 2007/0192085 | A1 | 8/2007 | Roulland et al. | |
| 2008/0091408 | A1 | 4/2008 | Roulland et al. | |
| 2008/0319978 | A1 | 12/2008 | Brun et al. | |
| 2009/0089047 | A1 | 4/2009 | Pell et al. | |
| 2009/0094019 | A1 | 4/2009 | Snow et al. | |
| 2009/0106224 | A1 | 4/2009 | Roulland et al. | |
| 2009/0292700 | A1 | 11/2009 | Castellani et al. | |

OTHER PUBLICATIONS

U.S. Appl. No. 12/720,900, Roulland, et al.
U.S. Appl. No. 12/484,569, Brun, et al.
(Continued)

*Primary Examiner* — Usmaan Saeed
*Assistant Examiner* — Paul Kim
(74) *Attorney, Agent, or Firm* — Fay Sharpe LLP (57) ABSTRACT

A system and method for guiding a user in building a query are disclosed. The method includes providing an interaction space in which a user formulates a query using a plurality of query building blocks selected from a predefined set of query building blocks. The user's formulation of the query is guided. Guiding selection of at least a next building block is provided by at least one of a content-based mechanism which limits the selection of the next building block to those which will yield at least one result from an indexed collection of documents, a structure-based selection mechanism which limits the selection of the next building block to those which meet a predefined grammar, and a usage-based selection mechanism which proposes a next building block based on patterns of building blocks used in building prior queries. Each of these guidance mechanisms may be provided with the result that the next block proposed is informed by each of the mechanisms.

3 Claims, 8 Drawing Sheets

(56) References Cited

OTHER PUBLICATIONS

Aït-Mokhtar, et al., "Incremental Finite-State Parsing," *Proceedings of Applied Natural Language Processing*, Washington, (1997).
Aït-Mokhtar, et al., "Subject and Object Dependency Extraction Using Finite-State Transducers," *Proceedings ACL '97 Workshop on Information Extraction and the Building of Lexical Semantic Resources for NLP Applications*, Madrid, (1997).
S. Aït-Mokhtar, J.P. Chanod, and C. Roux, "Robustness beyond shallowness: incremental deep parsing", Natural Language Engineering, 8, 2-3, pp. 121-144,2002, Cambridge University Press.
Sauri, R., Littman, J., Knippen, B., Gaizauskas, R., Setzer, A., Pustejovsky, J.: *TimeML Annotation Guidelines* (2006), available at www.timeml.org/site/).
D. W. Oard, B. Hedin, S. Tomlinson and J. R. Baron, "Overview of the TREC 2008 Legal Track". In Proc. 17th Text Retrieval Conf., TREC 2008, Gaithersburg, Maryland, USA, Nov. 18-21, 2008.
P. G. Anick, J. D. Brennan, R. A. Flynn, D. R. Hanssen, B. Alvey, and J. M. Robbins, "A Direct Manipulation Interface for Boolean Information Retrieval via Natural Language Query". In *Proc. of SIGIR'90*, 1990, pp. 135-190, ACM.
Kuntz and R. Melchert, "Pasta-3's Graphical Query Language: Direct Manipulation, Cooperative Queries, Full Expressive Power". In *Proc. of the 15th International Conference on Very Large DataBases*, Amsterdam, 1989.
H. Li, Y. Cao, J. Xu, Y. Hu, S. Li, and D. Meyerzon, "A New Approach to Intranet Search Based on Information Extraction". In *Proc. of CIKM'05*, Oct. 31-Nov. 5, 2005, Bremen, Germany, pp. 460-468, ACM.
A. De Leon Battista, N. Villanueva-Rosales, M. Palenychka and M. Dumontier, "SMART: A Web-Based, Ontology-Driven, Semantic Web Query Answering Application". In *Proc. of Semantic Web Challenge, International Semantic Web Conference, ISWC'07*, Busan, South Korea (2007).
Baeza-Yates, R. A. and Ribeiro-Neto, B. *Modern Information Retrieval*. Addison-Wesley Longman Publishing Co., Inc., 1999.
T. Hao, O. Zeng. and L. Wenyin, "Semantic Pattern for User-Interactive Question Answering". In *Proc. of the 2nd Int. Conference on Semantics, Knowledge, and Grid (SKG 06)*, IEEE (2006).
R. B. Allen, "A Query Interface for an Event Gazetteer". In *Proc. of the 4th International Conference on Digital Libraries (JCDL'04)*, pp. 72-73 (2004).
A. Hickl, P. Wang, J. Lehmann, and S. Harabagiu, "FERRET: Interactive Question-Answering for Real-World Environments". In *Proc. of the Coling/ACL 2006 Interactive Presentation Sessions*, pp. 25-28, Sidney, Jul. 2006.
Casemap, www.casesoft.com, accessed May 10, 2010.
J. Stasko, C. Gorg, and Z. Liu, "Jigsaw: supporting investigative analysis through interactive visualisation". In *Information Visualisation* (2008), vol. 7, pp. 118-132, Palgrave Macmillian Ltd.
N. E. Fuchs and R. Schwitter, "Web-Annotations for Humans and Machines". In *Proc. of the 4th European Conference on the Semantic Web: Research and Applications*. LNCS, vol. 4519, pp. 458-472, 2007.
Hagege, C. and Tannier, X., "XTM: A robust temporal processor", CICLing, Haifa, Israel, 2008.

\* cited by examiner

METHOD AND SYSTEM TO GUIDE FORMULATIONS OF QUESTIONS FOR DIGITAL INVESTIGATION ACTIVITIES

BACKGROUND

The exemplary embodiment relates generally to information retrieval and finds particular application in connection with a system and method which aids users in conducting searches within a document collection using predefined building blocks for generating queries.

Given the ability for storing large collections of documents electronically for review, the searcher is often presented with a difficult task of formulating queries designed to retrieve relevant documents. For example lawyers conducting discovery may receive many documents from the opposing party, as well as documents of their own, from which they wish extract information for building a legal case. Other examples include the case of a team of analysts investigating a conflict of interest or conducting an audit in an organization.

Searching and browsing facilities that most digital investigation tools typically offer aim to find relevant documents based on keyword/boolean search techniques. Concept-based search tools are also available. Although this has proved to be useful in some stages of a digital investigation, e.g., in first stages of a litigation process when identifying the set of responsive documents, in other stages, e.g., when constructing a legal case, the emphasis shifts from finding documents to trying to find entities, such as the characters involved in the litigation, and events and actionable information related to them.

Where the document collection is structured, through manual annotation, searchers can perform more advanced searches. However, manual annotation is generally not feasible for preparing large document collections for searching.

INCORPORATION BY REFERENCE

The following references, the disclosures of which are incorporated herein in their entireties by reference, are mentioned:

U.S. application Ser. No. 12/720,900, filed Mar. 10, 2010, entitled SYSTEM AND METHOD FOR GUIDING ENTITY-BASED SEARCHING, by Frederic Roulland, et al., discloses a system and method for refining a user's query for entity-based searching. An entity index generated from a corpus of documents is provided. The entity index includes a set of entity structures, each including a plurality of terms. The terms of an entity structure are features of the same entity. Entity structures are retrieved from the entity index which match a user's query. Clusters of retrieved entity structures which have at least one of their terms in common are identified. A cluster hierarchy is generated from the identified clusters in which nodes of the hierarchy are defined by one or more of the terms of the retrieved entity structures. At least a portion of the cluster hierarchy is presented to the user as a refinement tree for facilitating refinement of the user's query through user selection of a node of the refinement tree which, when formulated as a search, retrieves one or more responsive documents from the corpus of documents.

U.S. Pub. No. 2009/0292700, published Nov. 26, 2009, entitled SYSTEM AND METHOD FOR SEMI-AUTOMATIC CREATION AND MAINTENANCE OF QUERY EXPANSION RULES, by Stefania Castellani, et al., discloses a system and method which enable semi-automated generation of query expansion rules for searching a knowledge base. Candidate synonymy pairs are automatically extracted from queries made by users when searching a knowledge base. Synonymy rules are defined, based on the extracted candidate synonymy pairs, and may be context dependent. Query expansion rules based on the defined synonymy rules can then be exported to a storage medium for use in expansion of new user queries when searching the knowledge base.

U.S. Pub. No. 2009/0106224, published Apr. 23, 2009, entitled REAL-TIME QUERY SUGGESTION IN A TROUBLESHOOTING CONTEXT, by Frederic Roulland, et al., discloses a method for assisting a user to develop a query in a natural language. While the user's natural language query is being entered, a subset of ranked query suggestions from a collection of ranked query suggestions is presented to the user as candidates for user queries. The subset is based on that portion of the user's query already entered. Each of the query suggestions in the collection is formulated to retrieve at least one responsive instance in the knowledge base. The rankings of the query suggestions in the collection are based at least in part on stored logs of prior user sessions in which user queries were input to a search engine for retrieving responsive instances from the knowledge base.

U.S. Pub. No. 2008/0091408, published Apr. 17, 2008, entitled NAVIGATION SYSTEM FOR TEXT, by Frederic Roulland, et al., discloses a computer retrieval system that includes memory which stores instructions for receiving a user's query in a natural language, identifying text strings from an associated knowledge base, each containing at least one expression (word or multi-word expression) which is matched with at least one expression of the user query, and for refining the user's query by representing at least a group of the text strings as a navigation tree in which each of a plurality of selectable nodes comprises an expression representative of at least one syntactic unit in at least one of the identified text strings. Relationships between syntactic units are used in structuring the nodes of the navigation tree.

U.S. Pub. No. 2007/0192085, published Aug. 16, 2007, entitled NATURAL LANGUAGE PROCESSING FOR DEVELOPING QUERIES, by Frederic Roulland, et al., discloses a system suited to self-troubleshooting. Normalized forms of at least some of the words of a natural language user query input by a user are identified. The user query may describe a problem experienced with a machine, such as a printer. Text strings, such as problem statements, are retrieved. Each retrieved problem statement includes at least one word with a normalized form which is recognized as being equivalent to one of the identified normalized forms. Each of the retrieved problem statements may be associated with at least one solution sequence for addressing the problem with the machine. In the event that the stored problem statements in memory are not fully responsive, the processor provides one or more options for refinement of the user query based on tags associated with those words of the problem statements which are responsive.

U.S. Pub. No. 2007/0179776, published Aug. 2, 2007, entitled LINGUISTIC USER INTERFACE, by Frederique Segond, et al., discloses a system for retrieval of text which includes a processor which identifies grammar rules associated with text fragments of a text string that is retrieved from an associated storage medium, and retrieves text strings from the storage medium which satisfy the grammar rules.

U.S. Pat. No. 7,058,567, issued Jun. 6, 2006, entitled NATURAL LANGUAGE PARSER, by Aït-Mokhtar, et al., discloses a parser for syntactically analyzing an input string. The parser applies a plurality of rules which describe syntactic properties of the language of the input string.

BRIEF DESCRIPTION

In accordance with one aspect of the exemplary embodiment, a method for guiding a user in building a query includes providing an interaction space in which a user formulates a query using a plurality of query building blocks selected from a predefined set of query building blocks. Selectable ones of the query building blocks are displayed in the interaction space. The user's formulation of the query is guided. This includes, when at least one building block has been selected by the user for formulating the query, guiding selection of at least a next building block by at least one of a content-based mechanism which limits the selection of the next building block to those which will yield at least one result from an indexed collection of documents, a structure-based selection mechanism which limits the selection of the next building block to those which meet a predefined grammar, and a usage-based selection mechanism which proposes a next building block based on patterns of building blocks used in building prior queries.

In accordance with another aspect of the exemplary embodiment, a computer program product includes tangible media encoding instructions, which when executed by a computer, perform a method. The method includes providing an interaction space for a user to formulate a query using a plurality of query building blocks selected from a predefined set of query building blocks, contemporaneously displaying at least a subset of the query building blocks for selection, and receiving a user's selection of a response type building block from the displayed query building blocks into an editing area of the interaction space. After the receiving of the user's selection of the response type building block, a user is guided in formulating the query including, providing a content-based mechanism which limits selectable blocks to those which will yield at least one result from an indexed collection of documents, providing a structure-based selection mechanism which limits selectable blocks to those which meet a predefined grammar; and providing a usage-based selection mechanism which proposes a next building block based on patterns of building blocks used in building prior queries.

In accordance with another aspect of the exemplary embodiment, a system for guiding a user in building a query includes a user interface generator which generates an interaction space for display on an associated graphical user interface, the interaction space enabling a user to formulate a query using a plurality of query building blocks selected from a predefined set of query building blocks, wherein selectable ones of the query building blocks are displayed in the interaction space. A guidance module is provided for guiding a user in formulating the query, including a content-based selection component which limits the selection of a next building block to those which will yield at least one result from an indexed collection of documents, a structure-based selection component which limits the selection of the next building block to those which meet a predefined grammar, and a usage-based selection component which proposes a next building block based on patterns of building blocks used in building prior queries. A query module receives a formulated query that is submitted by the user via the interaction space and returns responsive results. A computer processor implements the user interface generator, guidance module, and query module.

DETAILED DESCRIPTION

A system and method are disclosed for supporting users in searching for information in large collections of documents during their digital investigation activities through an interaction mechanism which guide users in the formulation of search queries (or "questions") and which may also take into account collaborative aspects in the case of team work.

As used herein a "document" can be any stored digital information from which text can be extracted, and can include scanned document images, such as images of letters, graphs, charts, memoranda, reports, etc., web pages, meta data, word documents, spreadsheets, videos, audio recordings, and the like.

The exemplary system guides the user in generating a query in a natural language from a set of element building blocks through a graphical user interface. The user is able to select available elements to create the query. The interface guides the user by allowing only available types for formulating questions (e.g., who/what/where/) to be selected and also only available elements (e.g., people name/company name/location/etc), based on the content of the collection of documents (e.g., by only allowing the user to formulate a query which is coherent with the content of the documents, and which will thus retrieve at least one response). This allows the user to create questions more efficiently with feedback about the content in order to access pertinent documents. The system guides the users, allowing them to specify incrementally, as a composition of building blocks, controlled natural language expressions, including entities and relationships among entities, extracted from documents in the collection. This control of the scope of a query may also combined with an indication of the quantity (e.g., number or proportion) of documents reflecting the current state of the query. This is particularly useful in defining queries which will return a reasonable number of responsive documents. The interaction mechanism may also leverage information on the past history of user requests, either from the user or from his co-workers, to make suggestions to the users as to how to compose their questions.

An aim of the interface mechanism is to allow the users to express questions in a guided way so that the system can understand what is the user's intent and allow the user to see what the system is able to deal with. The interface is designed to facilitate the answering of WH questions, which can be expressed in a form which starts with the word Who, Which, When, Where or What. In the litigation context, for example, a user may wish to formulate questions which are intended to find out about a harmful product, and what the company marketing the product knew about the harm and when it found out, such as:

(1) What were the results of the clinical tests?

(2) When were the results of various tests produced?

(3) Which meetings did the senior researchers attend after the production of the test results?

(4) Who else participated in those meetings?

(5) What did the publicity released by the company after the production of the test results say?

In the exemplary system, the searchable content need not be structured so that it maps the possible combinations of building blocks to a general form Subject+predicate+object+{modifiers}. Rather, the indexing of the searchable content can result from the extraction of information using natural language processing (NLP) techniques. Modifiers, in the present case, can include spatio-temporal attributes defining constraints on the predicate. For example, to search for information on (3), a temporally based comparison between the time that tests were produced and meetings that took place is employed. Additionally, a "meeting" can be inferred based on one or more of the people in proximity, their social/business relations, the topic of their discussion, and the stated location.

Figure 1:
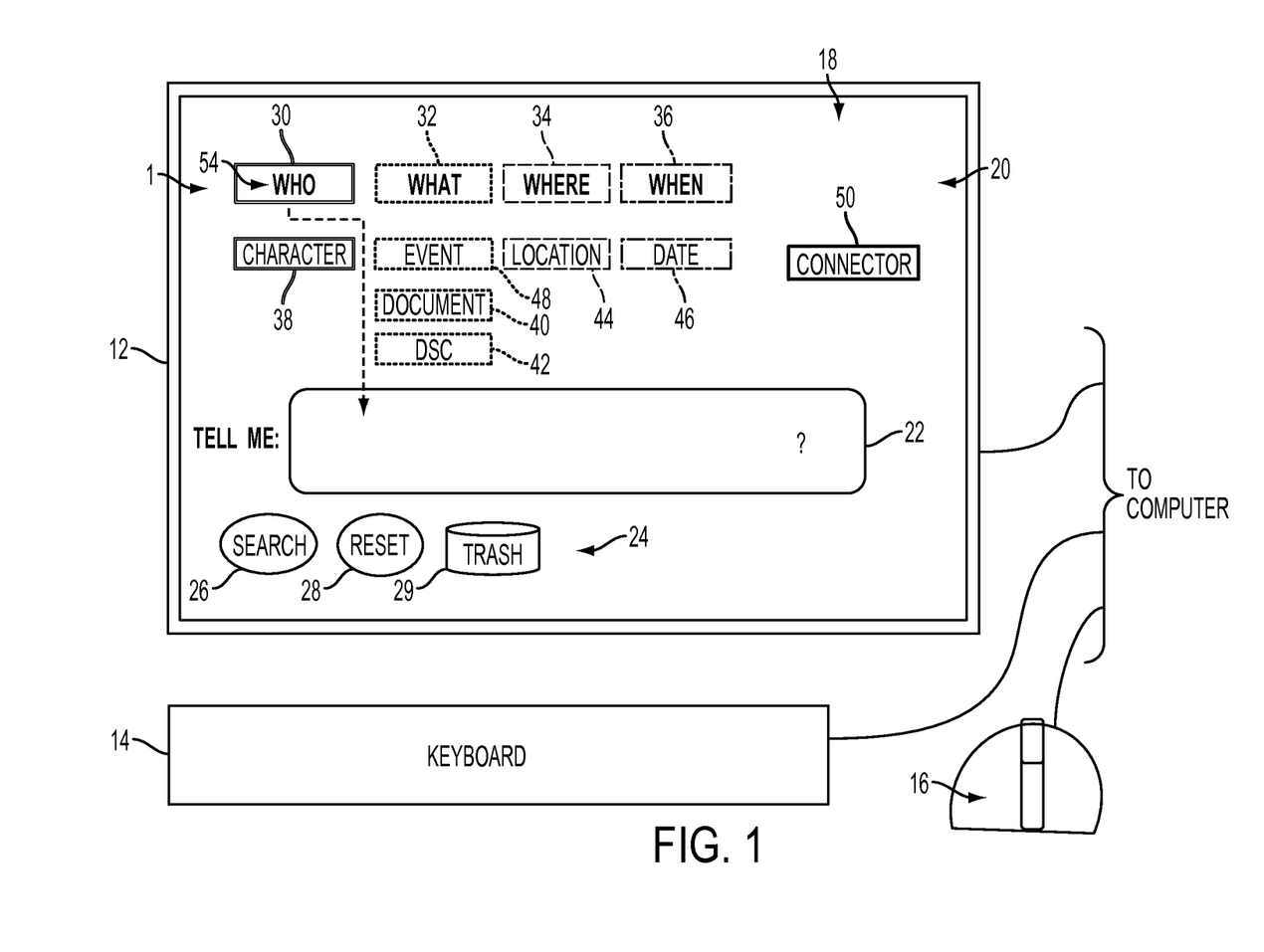
FIG. 1 is a screenshot illustrating the building blocks available to the user on a graphical user interface prior to starting to compose a query.
Figure 2:
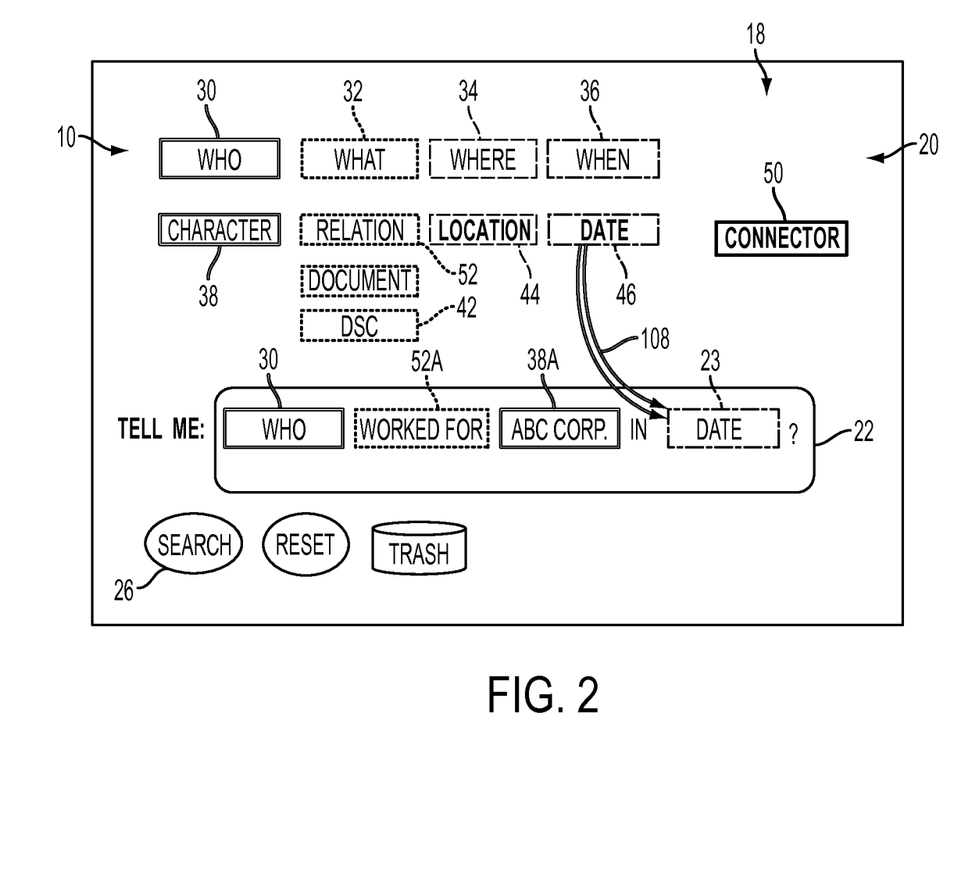
FIG. 2 is a screenshot illustrating the building blocks available to the user on a graphical user interface during composition of a query.

With reference to FIGS. 1-2, a graphical user interface 1 in accordance with one aspect of the exemplary embodiment is shown. The graphical user interface is linked to a computing device 10 (FIG. 4) and includes a display 12 and a user input device 14, 16, such as a keyboard, keypad, touch screen cursor control device, or the like.

The user interface 1 displays a user interaction space 18. A user may open up the interaction space 18 through a web browser on his personal computer or by starting a program stored in computer memory and interact with it via the user input device 14, 16. The interaction space 18 is organized in three areas: a building block selection area 20, a question editing area 22, and a control area 24. The question editing area 22 allows the user to build a question 23 (FIG. 2) using the building blocks that are made available in a guided way. The control area 24 allows the user to launch the search corresponding to the question (using search button 26), to reset it (with reset button 28), or to remove a building block (which may be placed in the trash 29).

In the building block selection area 20, blocks are displayed from a set of predefined blocks 30, 32, 34, 36, 38, 40, 42, 44, 46, 48, 50, 52 (FIGS. 1 and 2), some or all of which are displayed at any time during formulation of a query. Each block corresponds to a respective element which can be used in building a query. The exemplary blocks are rectangular although other shapes are contemplated. The blocks may each be colored according to a respective category of block. Each block includes a descriptor 54, which describes in words or with a suitable icon, a respective type of element of the query corresponding to that block. In the exemplary embodiment, each block is labeled with a word or phrase as its descriptor (such as Who, When, etc). The user is expected to select blocks in sequence to formulate a query, the resulting query being the sequence of blocks selected and, for each block, any specific instance of the block which has been selected.

Some of the elements are question types. Specifically, each of a set of question types is associated with a respective result type building block 30, 32, 34, 36. In the illustrated embodiment, the WHO block 30 covers questions designed to identify a character capable of action, such as a person's name or organization (e.g., name for a group of people, company name, government entity, other organization) etc. (and thus also covers "WHICH organization" type questions). In other embodiments, additional result type blocks specific to types of characters may be provided. The WHAT result type block 32 covers questions designed to identify an event, object (e.g., documents, although other types of evidentiary objects are also contemplated), or a domain specific concept (DSC). The WHERE block 34 covers questions designed to identify a location, which may encompass both broadly defined locations, such as "in France" as well as more narrowly defined locations, such as "on X's computer." The WHEN block 36 covers questions designed to identify a temporal expression, such as "on Apr. 14, 1998", more loosely defined temporal expressions, such as "on Monday" or "in February", and relative expressions, such as "since 1984".

The building block selection area 20 also shows the available types of composition building blocks 38, 40, 42, 44, 46, 48, 50, 52, which can be used to formulate a question once a result type block has been selected. These composition blocks include blocks representing elements such as entities, relations, and events. The illustrated entities include building blocks 38, 40, 42, 44, 46, for Characters (e.g. people, organizations, etc), Documents, DSC's, Locations, and Dates (temporal expressions). Also shown is an Event building block 48. The instances of the blocks 38, 40, 42, 44, 46, 48 are extracted from a document collection, and indexed according to a respective block element type.

The connectors block 50 allows a user to specify a connector, such as "AND" or "OR", which enables the user to define composed questions. As is evident from FIG. 1, not all of the building blocks may be displayed at any one time (the Relations block 52 is not shown in FIG. 1, see FIG. 2). Relations are the relationships among entities. As examples, these include phrases such as "is mentioned," "said," "knows," "were together," "worked for," and the like. These are made available by an information extraction system directly from the collection of documents or as aggregations of other relations and information, as described in detail below.

As shown in FIG. 1, the composition building blocks 38, 40, 42, 44, 46, 48, may be listed under the most appropriate result type block 30, 32, 34, 36, to indicate to the user that these blocks are useful in formulating the respective WHO, WHAT, WHERE, or WHEN question.

In the exemplary embodiment, the user starts to build a question by choosing the type of answer he would like to get by choosing one of the result type building blocks "WHO", "WHAT", "WHERE", and "WHEN" 30, 32, 34, 36. At this stage of the interaction, these are the only building blocks which are active (active blocks are illustrated in the exemplary embodiments with bold lettering). Other blocks which are currently inactive, such as blocks 40, 42, 44, 46, and 50, may be shown, but grayed out or otherwise differentiated from the active building blocks, to indicate to the user that they cannot be used at this time, as shown in FIG. 1. In some embodiments, no more than thirty building blocks are available to be displayed in the interaction space (not including the block(s) the user has selected for formulating the question), and generally, no more than twenty of these may be active at any time, i.e., selectable.

Once one of the building blocks 30, 32, 34, 36 is selected, e.g., block 30, the user positions the block in the question editing area 22, for example, by clicking on the selected building block 30 with the cursor control device 16 and dragging and dropping the box into area 22. The selection of a block in this way limits the user's choice among the available building blocks which can form a valid question, according to a grammar and the searchable content of the database (i.e., whether or not the combination would retrieve any responsive documents). Once this block has been selected, all of the response type blocks 30, 32, 34, 36 are disabled.

Some or all of the composition building blocks 38, 40, 42, 44, 46, 48, 50, 52 may include subtypes, which are themselves building blocks. The exact nature of these blocks will depend on what subtypes are identifiable in the database content. Selecting one of these composition blocks, the user can choose one of the available sub-types, if any, and then drag and drop the selected building block to the editing area 22.

Where appropriate, a building block within the editing area 22 then becomes an editable entry. In editing a block, the user is able to select only from stored instances ("values") of the building block type, and cannot change the type of the block. Instances from the respective category may be suggested as the user types the characters in the building block. Suggestions may also be provided on the basis of past users' formulated questions as described in further detail below. Dropping an entry out of the editable area 22 or into the trash bin 29 removes it from the question 23.

Examples of the composition block types may be as follows:

1. "character", which may contain, as sub-types, named entities such as people and organizations (which may include companies, government bodies, and other organizations) and which allows a user to select from a stored set of instances of characters extracted from the document collection.

2. "event", e.g., meetings. Such blocks may become available if a "WHAT" question has been selected, or following selection of a "relation", e.g., "participated in," if a "WHO" question has been selected.

3. "relations", e.g., a relation "mention" which corresponds to the search for documents mentioning specific characters, DSCs, or events. Other relations, such as "said," "knows," "were together," "worked for," may also be assigned respective building blocks.

4. "document", which allows to search for documents mentioning specific entities.

5. "domain specific concept (DSC)", which allows a user to specify an instance of a set of domain-specific objects, e.g., names of products, tradenames, chemicals, patents, classes of these, or the like of particular significance to the type of search, and which may have been selected by users of the system and stored in memory, e.g., as a list.

6. "location," which allows a user to select from a stored set of location instances;

7. "date", which allows a user to select a date or other temporal expression;

8. "connector", which contains "AND" and "OR" sub-types.

The system and method are not limited to these particular composition blocks. However, the set of composition blocks available to the user is predetermined before the composition of a query begins.

Figure 3:
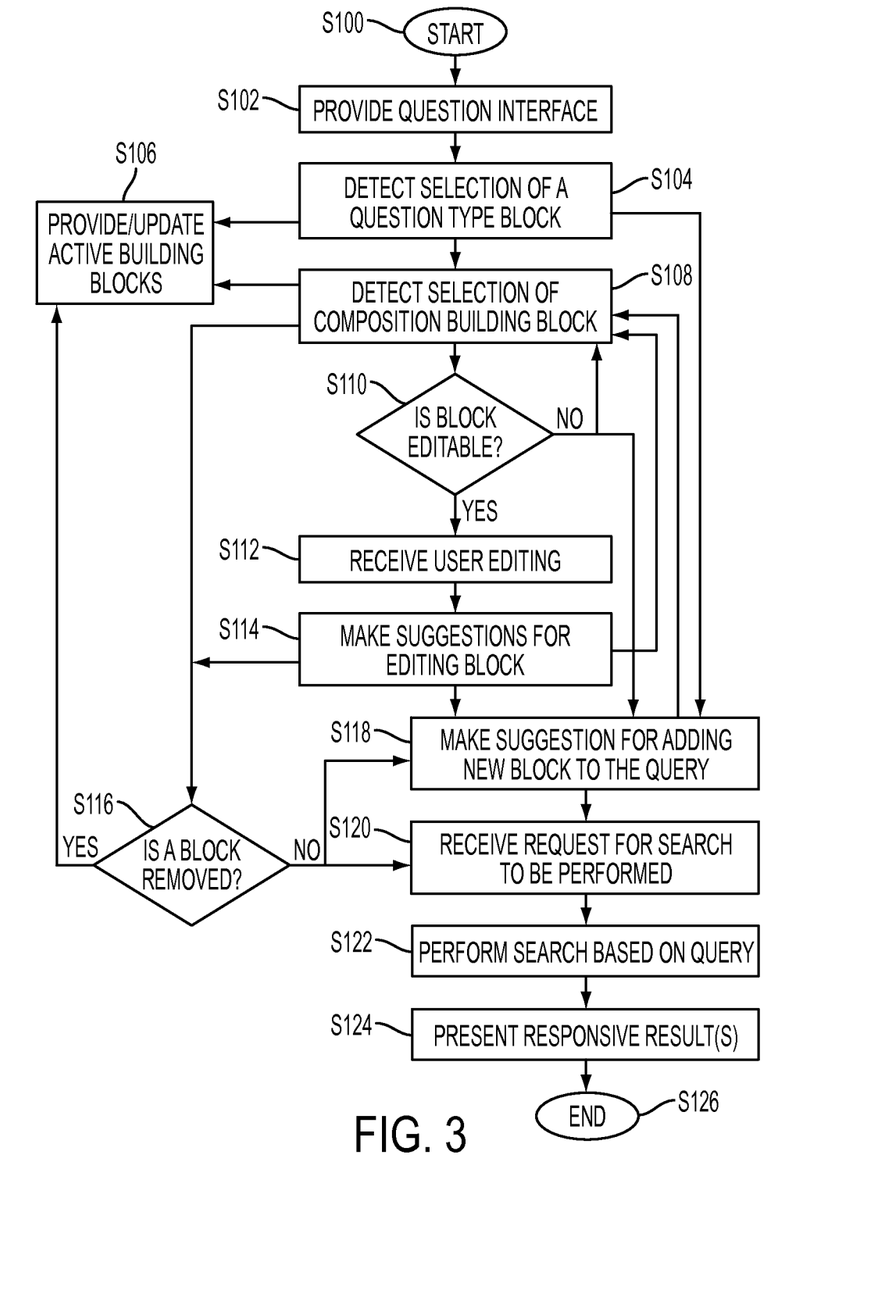
FIG. 3 is a flow diagram illustrating a method of guiding a user in building a query in accordance with one aspect of the exemplary embodiment.
Figure 4:
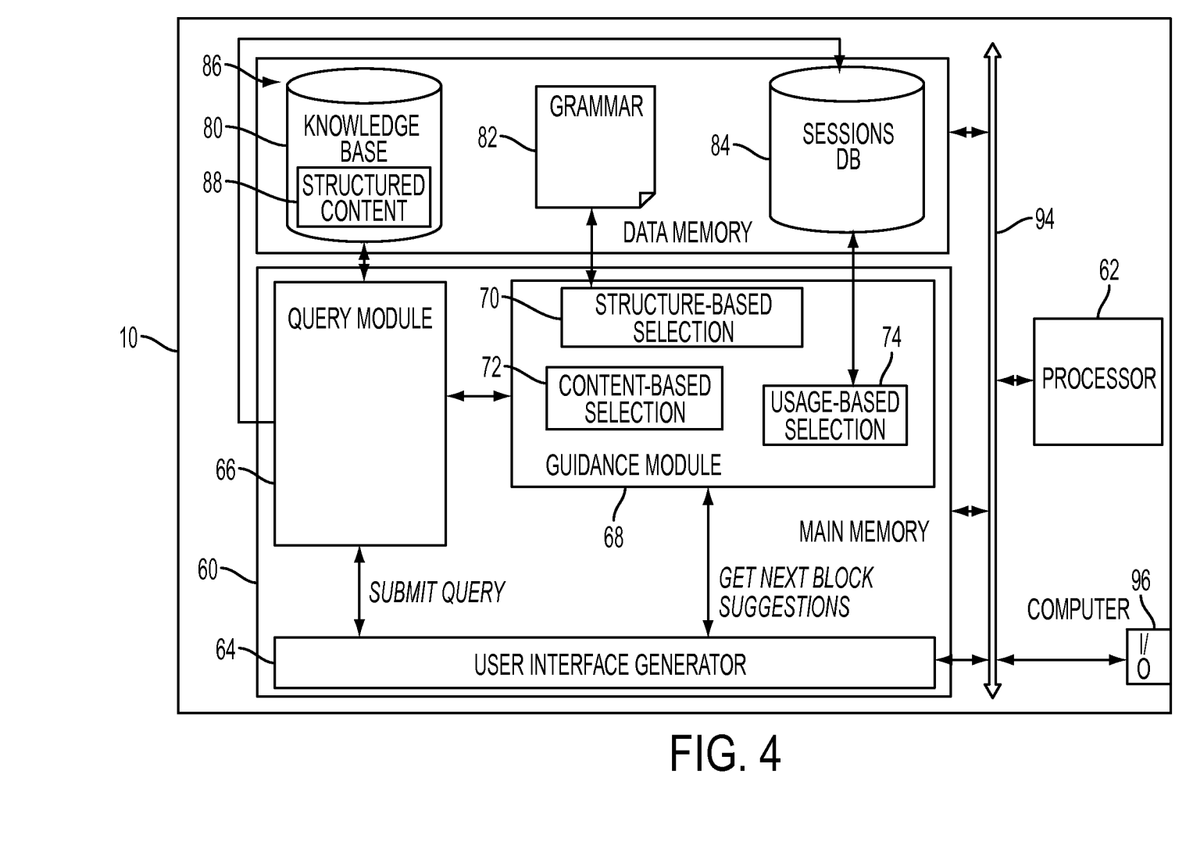
FIG. 4 illustrates a system for query guidance in accordance with another aspect of the exemplary embodiment.

FIG. 3 illustrates the exemplary method of building a question which may be performed with the interface 1 of FIGS. 1 and 2 and system 10 of FIG. 4, to which reference is made. The method begins at S100.

At S102, the query building interface 1 is displayed, e.g., in response to a user's request.

At S102, the interface provides for a user to select a result type block 30, 32, 34, or 36, which specifies the question type.

At S104, the system 10 detects that a question type (Who, What, Where, or When) has been selected and at S106 provides for certain ones of the building blocks to be active, while others are disabled (including all the result type blocks), based on the block selected.

At S108, the system 10 detects that a user has selected a composition building block and provides for certain ones of the building blocks to be active, while others are disabled, based on the block selected.

If at S110, the selected building block is editable, at S112 the system provides for the user to type/select an entry for the block and the system receives the selected entry. Only one instance of the particular block may be entered in the block in the editing stage.

At S114, e.g., while the user is typing the entry, or immediately on selection of the block, the system provides guidance to the user in the form of suggestions of instances of the block. The suggestions may be based on one or more of: knowledge base content and prior user queries.

If at S116, a block is removed, the system provides for certain ones of the building blocks to be active, while others are disabled, based on the remaining blocks.

At any time after the user has selected a block, the system 10 may propose a next block (S118). Suggestions for expanding the question 23 beyond the current block may be based on one or more of prior user queries, knowledge base content, and applicable grammar rules.

The method may proceed through several iterations of block selection and editing until at S120, a request for a search to be performed, based on the question, is received.

At S122, the system converts the question 23 into a suitable form for querying the knowledge base 80 and conducts a search.

At S124, at least a subset of responsive results is presented to the user via the display. The results may include one or more entire responsive document(s), highlighted portions thereof, an answer to the question extracted from the knowledge base 80, or a combination thereof.

The method ends at S126. Since the method is dynamic, the next step will depend, to some degree, on what the user selected as the latest text block. Thus, the method should not be considered as requiring all of the steps shown, or that the steps should be performed in the order illustrated.

Returning to FIG. 2, by way of example, the composition of the question "Who has worked for ABC Corp. in 2002?" is under development. In the illustrated query being built, the user began by dragging and dropping the WHO building block 30 into the editable area 22. At this point, the four result type blocks 30, 32, 34, 36 were grayed out, indicating to the user that they are not currently available. Other building blocks then became available and were highlighted to indicate them as active, such as the relation building block 52 in this example. The user dragged this block into the working area 22, whereupon it became an editable entry. The user began typing characters of the word "worked" in the box 52 and the system suggested "worked for", which suited the user so the edited building block 52A shows the selected text. In some embodiments, a limited set of relations may be presented to the user from which he is able to select one. Having selected the first two blocks as shown, other ones of the building blocks become available, such as the character building block 38. This building block may have a sub-building block "character"/"organization", which the user has selected. The user has dragged this into the editable area and edited it to shown the name of the company he is interested in: ABC Corp. to form edited block 38A. If this company is not among the searchable content of the database, the system 10 does not let the user type the entry and may suggest other "organization" options. In some embodiments, the system may display a list of organizations, from which the user is able to select ABC Corp. Only organizations extracted from the searchable content are displayed as "organization" options (made available by content guidance, as described below).

Active building blocks at this stage included Location 44, Date 46, and Connector 50. The user decides to select Date and drags the date building block 46 into the working area 22 (or the 10 system may propose the Date block 46, based on a ranking from prior user queries, as explained below, and have it accepted by the user). The user can then edit the date to specify a value, e.g., "2002". The expression "in" has been chosen by the user among the possible temporal expressions suggested by the system either before or after the selection of the Date building block (by grammar guidance as explained below). If the user omits it, the system may automatically insert the word "in" to render the sentence grammatically correct. At this stage of the composition of the question, the user can further specify a Location and continue adding a connector, for example "and participated in a conference". This last addition could also be the result of a suggestion from the system 10 on the basis of previous user formulated questions as explained below. When the user is satisfied with the question 23, he initiates a search of the database by actuating the search button 26.

The method described herein thus guides the user in performing a search. The user can specify, in a guided way, WHs questions by combining building blocks that correspond to entities and their relationships related to them. The interaction mechanism also leverages information on the past history of requests, from the user or from his co-workers. The user interaction, the guidance mechanisms that support the interaction, and the architecture of the system for the exemplary method are described in further detail below.

The method illustrated in FIG. 3 may be implemented in a computer program product that may be executed on a computer. The computer program product may be a computer-readable recording medium on which a control program is recorded, such as a disk, hard drive, or the like. Common forms of computer-readable media include, for example, floppy disks, flexible disks, hard disks, magnetic tape, or any other magnetic storage medium, CD-ROM, DVD, or any other optical medium, a RAM, a PROM, an EPROM, a FLASH-EPROM, or other memory chip or cartridge, or any other tangible medium from which a computer can read and use. Alternatively, the method may be implemented in a transmittable carrier wave in which the control program is embodied as a data signal using transmission media, such as acoustic or light waves, such as those generated during radio wave and infrared data communications, and the like.

The exemplary method may be implemented on one or more general purpose computers, special purpose computer(s), a programmed microprocessor or microcontroller and peripheral integrated circuit elements, an ASIC or other integrated circuit, a digital signal processor, a hardwired electronic or logic circuit such as a discrete element circuit, a programmable logic device such as a PLD, PLA, FPGA, Graphical card CPU (GPU), or PAL, or the like. In general, any device, capable of implementing a finite state machine that is in turn capable of implementing the flowchart shown in FIG. 3, can be used to implement the method.

With reference to FIG. 4, an exemplary computer system 10 for performing the method illustrated in FIG. 3 is shown. The system includes main memory 60, which stores instructions for performing the exemplary method, and an associated processor 62, which executes the instructions. The computer system 10 may be a PC, such as a desktop, a laptop, palmtop computer, portable digital assistant (PDA), server computer, cellular telephone, pager, or other computing device or combination of computing devices capable of executing instructions for performing the exemplary method. The computer 10 may be the same computer which hosts the GUI 1 or may be a remote computer linked by a wired or wireless network to the user's computer.

In particular, the software instructions may be organized into a user interface generator 64, a query module 66, and a guidance module 68. The user interface generator 64 supports the user interaction space 18. In particular, the interface generator 64 generates the user interaction space 18 and receives the inputs by a user via the GUI 1, which are submitted to the query module 66. Next block suggestions are received by the interface generator 64 from the guidance module 68. The guidance module 68 handles the user guidance for the elaboration of a building blocks question 23. The guidance module may include components for guiding the query development including a structure based selection component 70, a content-based selection component 72, and a usage-based selection component 74. The query module 66 and guidance module 68 have access to a knowledge base (KB) 80, a grammar component 82, and a sessions database 84. These may be stored in memory 86 resident on the computer or on a remote memory storage device or devices accessible to the computer. The structure-based selection component 70 allows the user to compose sequence of blocks that are correct according to a predefined grammar, provided by grammar component 82, which is constructed for the language to be used in generating the question 23. The usage-based selection component 74 suggests building blocks to the user according to previously input questions, either by the user or by others. Block patterns from these earlier questions are stored in the sessions database 84. The content-based selection component 72 makes suggestions to the user according to the content of the knowledge base 80.

Figure 5:
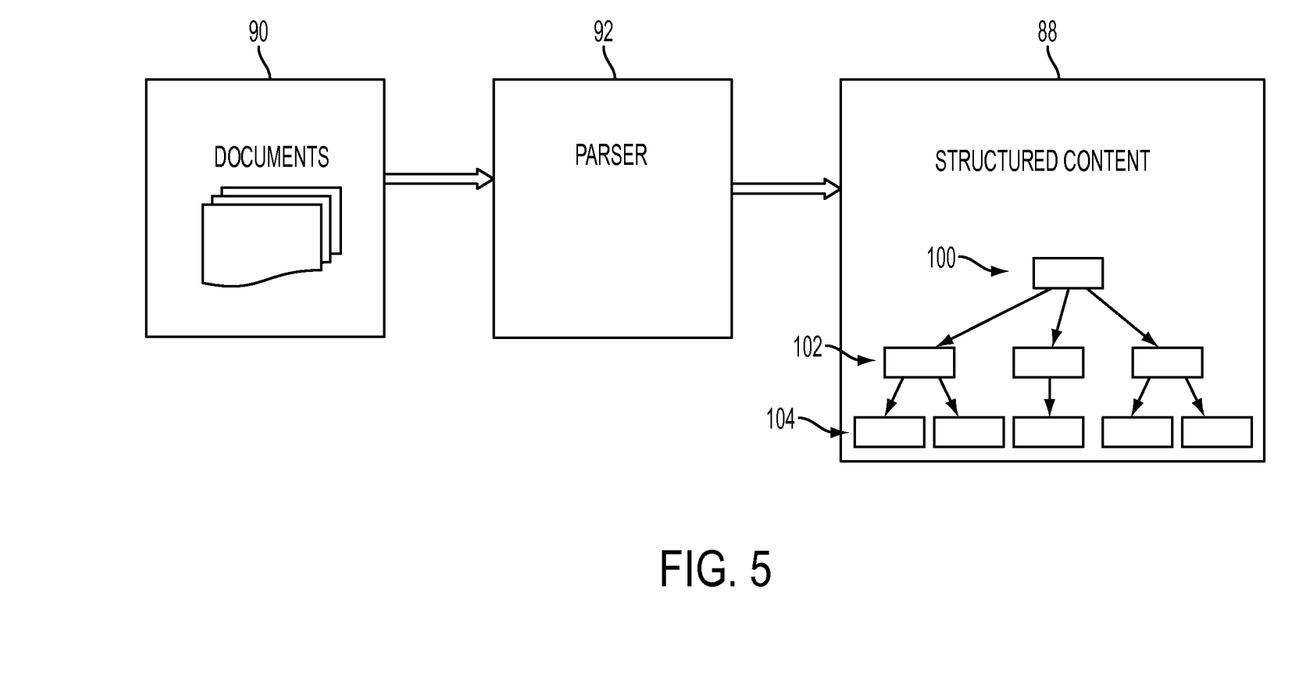
FIG. 5 is a block diagram illustrating the generation of structured content of a knowledge base in accordance with another aspect of the exemplary embodiment.

The knowledge base 80 stores the contents of the documents of a given collection in an indexed form that has been previously extracted and organized by an information extraction system. The exemplary KB 80 contains, for each text string (e.g., sentence) extracted from a corpus of documents 90, a structured representation 88 of the information which has been extracted from that text string. The information may be extracted using a parser 92 (FIG. 5).

The query module 66 receives a submitted question 23 from the interface 64 and accesses the guidance module. It integrates necessary data type conversions. Query module 66 also includes a low-level framework to create and access the KB 80.

Components 60, 62, 86, of the system 10 may communicate via one or more data\control buses 94 and with the graphical user interface 1 via a network interface 96, such as a modem or other output device.

The memory 60, 86 may represent any type of tangible computer readable medium such as random access memory (RAM) device, read only memory (ROM) device, magnetic disk or tape, optical disk, flash memory device, or holographic memory device. In one embodiment, the memory 60, 86 comprises a combination of random access memory and read only memory. In some embodiments, the processor 62 and memory 60 may be combined in a single chip. The network interface 96 allows the computer to communicate with other devices via a computer network, such as a local area network (LAN) or wide area network (WAN), or the internet, and may comprise a modulator/demodulator (MODEM). Memory 60, 86 stores instructions for performing the exemplary method as well as the input question 23.

The digital processor 12 can be variously embodied, such as by a single-core processor, a dual-core processor (or more generally by a multiple-core processor), a digital processor and cooperating math coprocessor, a digital controller, or the like. The digital processor 30, in addition to controlling the operation of the computer 16, executes instructions stored in memory 28 for performing the method outlined in FIGS. 2 and 3.

Further details of the exemplary system and method now follow:

Knowledge Base 80

The structured representation 88 in the exemplary knowledge base 80 is an instantiation of a knowledge model. The knowledge model (or ontology) is used to describe the data to be extracted for supporting investigation activities and is structured in layers. The exemplary structured representation 88 has three different layers 100, 102, 104. The first layer 100 supports the integration with the indexing tools focusing on low-level features (such as text zones), the second layer 102 represents entities useful in the investigation domain (such as people, organizations, DSEs, and relations between them), and the last layer 104 allows case specific information to be included (e.g. for a product liability case, chemical elements and other substances).

Figure 6:
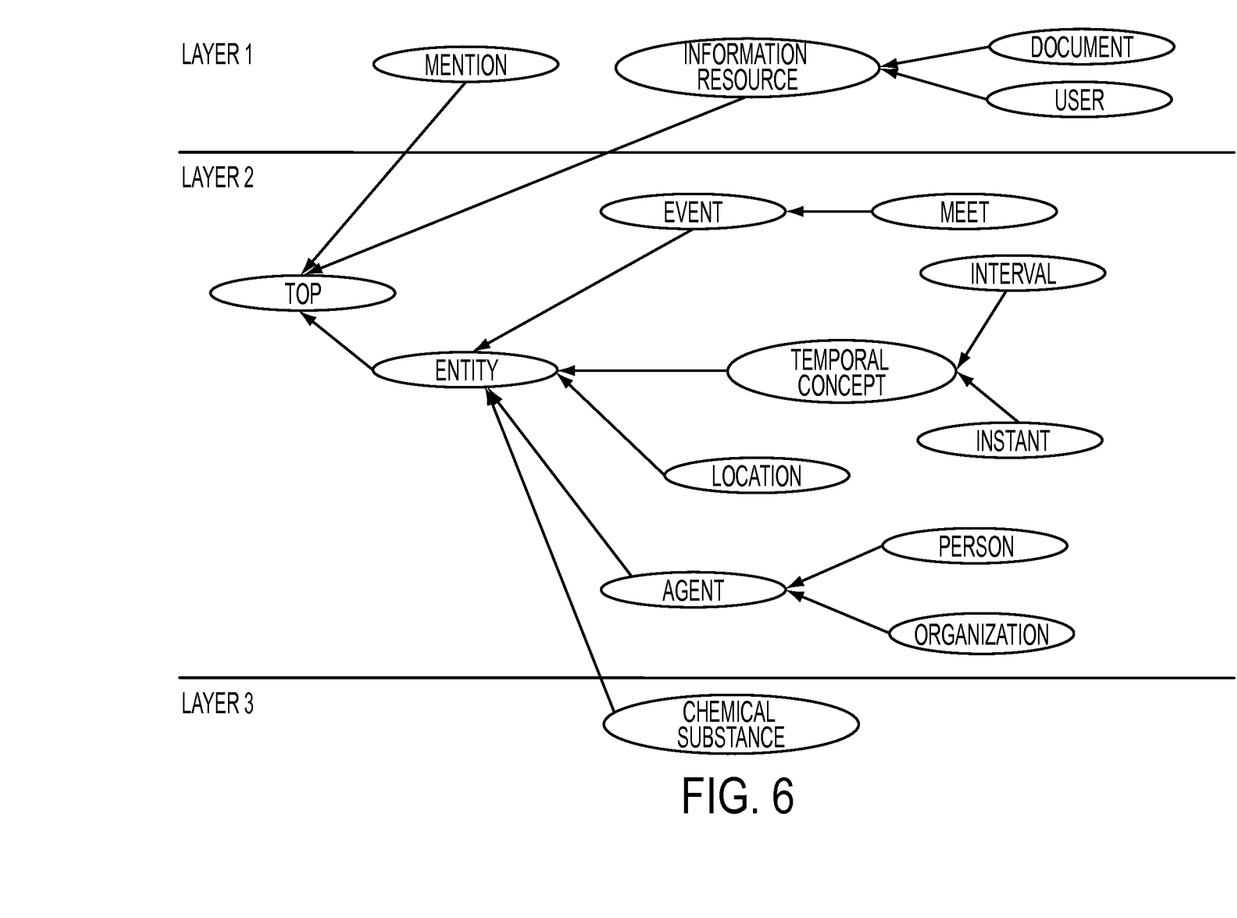
FIG. 6 illustrates a part of the knowledge model used for indexing.

A part of the knowledge model is illustrated in FIG. 6, where the arrows indicate specialization relations (e.g., Location is an Entity) and the ovals represent classes/concepts.

The following information may be explicitly represented in the structure:

1. Entities defining organizations (both companies and other associations), people, documents, locations, dates/times and events (where an event is used to define states and transitions between states).

2. Temporal and spatial features of events (e.g., when and where an event occurred).

3. Event classes (e.g., "X talks to Y" and "X emails Y" can be abstracted as X CONTACT Y with CONTACT being an event class, X its agent and Y its recipient). In the litigation context, key events may include cognitive (e.g., KNOW), interaction (e.g., MEET, CONTACT), reference (e.g., SAY), and role-based events (e.g., WORK FOR).

Figure 7:
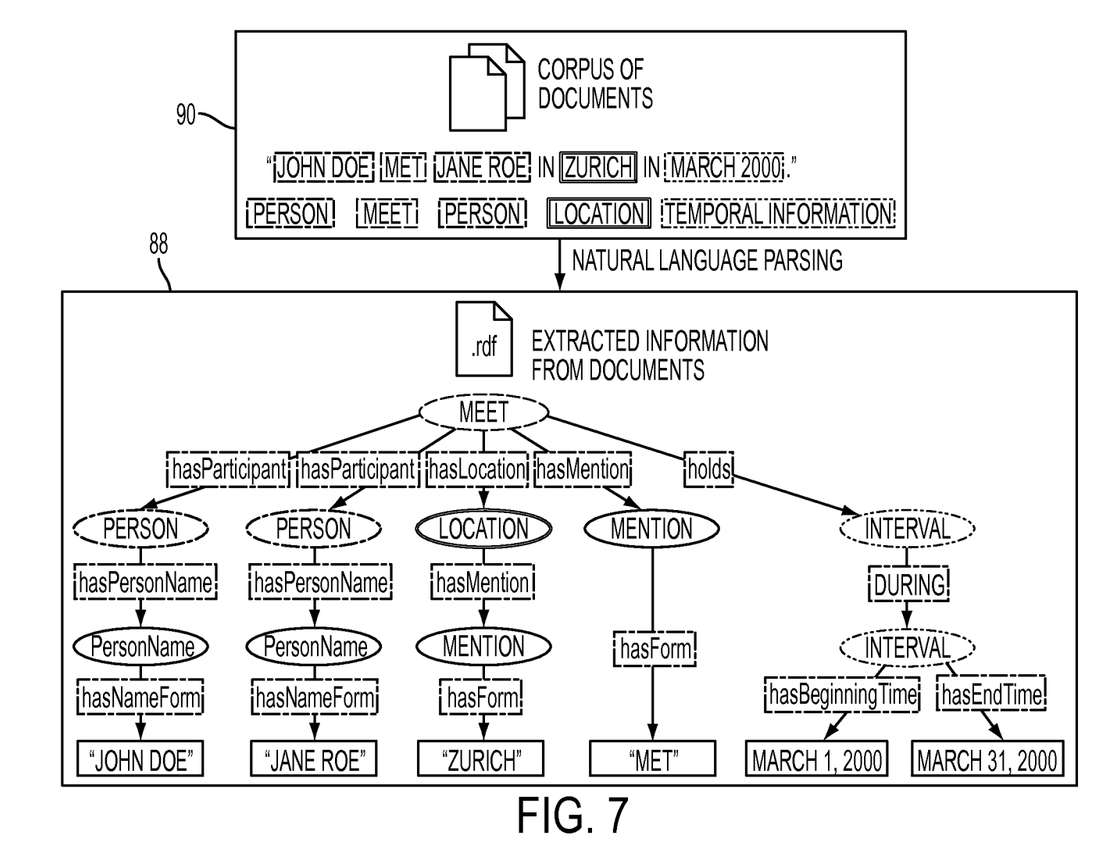
FIG. 7 illustrates an example of an indexed sentence.

An example of an indexed sentence is given in FIG. 7. The sentence "John Doe met Jane Roe in Zurich in March 2000" contains the word "met" that evokes an instance of the "MEET" event class, which in turn is linked to the participants of the event (i.e., "John Doe" and "Jane Roe"). The event is spatially anchored to Zurich and temporally defined as taking place at some time between the first and last day of March.

Guidance Mechanisms

The exemplary system 10 uses a combination of structure-based, usage-based, and content-based guidance mechanisms to help the user to specify a question. At each step of the question construction, the structure-based mechanism provided by component 70 is used to offer, to the user, only query building block types which will result in a syntactically valid question extension. This first mechanism provides a filtered list of available building blocks. This list can be further filtered by the content-based mechanism provided by component 72 that will remove all the building blocks that are syntactically valid but that would not lead to an answer in the current document collection 90. This results into a filtered list of question extension building blocks that are syntactically valid and will have some results. A third process is performed on this list using the usage-based mechanism of component 74 in order to rank the list according to the most frequently-used query patterns. This third step is particularly helpful in the selection of the first few blocks of a question 23, where the list of possible sub-blocks may be quite long. The user can then select within this resulting list the extension which appears most appropriate for the query. Once a new block is selected, the content-based mechanism 72 can be used in a second step in order to suggest only instances of entities or relations for that block that will lead to some results.

A. Guidance Based on Question Structure

A principled approach towards question development supports the distinction among syntactic, semantic, and content-based features. In the exemplary method, constraints pertaining to syntactically valid question structures are defined in terms of a grammar 82, while the logic-based knowledge base structure 88 describes the world knowledge used to semantically interpret the queries. The grammar 82 has a finite set of non-terminal symbols, {<question>, <result type>, <question element>, <what>, <who>, <relation>, <entity>, <modifiers>, <expr>, <connector>}, a finite set of terminal symbols {"where", "when", . . . } and a finite set of production rules, examples of which are listed in Table 1 below. The starting symbol is <question>. The grammar enables the creation of questions that are semantically and syntactically unambiguous.

TABLE 1

| Rule | non-terminal symbol | production rules |
|---|---|---|
| (1) | <question> | <result type> <expr> |
| (2) | <result type> | "where" |
|  |  | "when" |
|  |  | <what> |
|  |  | <who> |
| (3) | <what> | "what:event" |
|  |  | "what:document" |
|  |  | "what:"<tbox:label of domain specific concept> |
| (4) | <who> | "who:person" |
|  |  | "who:organization" |
| (5) | <expr> | <question element> |
|  |  | <expr> <connector> <expr> |
| (6) | <connector> | "and" |
|  |  | "or" |
| (7) | <question element> | [<entity>] <relation> [<entity>] |
| (8) | <relation> | <tbox:event type> [<modifiers>] |
| (9) | <entity> | <abox:individual> ":" [<tbox:label of concept>] |
|  |  | <tbox:label of concept> |
| (10) | <modifiers> | ["occurred"] "in:" <abox:location> |
|  |  | "in:" <abox:date> |
|  |  | "before:" <abox:date> |
|  |  | "after:" <abox:date> |
|  |  | "before:" <abox:date> "and after:" <abox:date> |
|  |  | <relation> |

In the above, the notation < . . . > is used for non-terminal symbols which are expandable, i.e., have two or more sub-types. The "notation " . . . " indicates the lowest level of sub-type which is not further expandable.

Rule (1) indicates that a question is a combination of two different types of building blocks. The <result type> symbol corresponds to one of the building blocks 30, 32, 34, 36 that define the type of results that should be returned by the query. These building blocks are able to cover the WHs questions. A result type building block is necessarily present in all different combinations.

The <expr> symbol includes a conjunction, disjunction, or simple question element building blocks (see rules (5) to (9)).

Rules (2)-(4) define the terminals for the result type building block. The symbol <tbox:label of domain concept> is used to describe the set of domain specific classes that are relevant for a specific case but not necessarily required for all investigation activities (e.g., chemical substance, product name, etc). So, if $C=\{c_1, c_2, \ldots, c_n\}$ is the set of n such concepts retrieved from the ontology and $LC=\{lc_1, lc_2, lc_n\}$ is the set of labels corresponding to those concepts, then the set of rules $RC=\{Rc_1, Rc_2, \ldots, Rc_n\}$ is generated as follows.

$$Rc_1 = (i) \quad <\text{what}> \quad \rightarrow \quad \text{"what } lc_1\text{"}$$

$$Rc_2 = (i+1) \quad <\text{what}> \quad \rightarrow \quad \text{"what } lc_2\text{"}$$

...

$$Rc_n = (i+n) \quad <\text{what}> \quad \rightarrow \quad \text{"what } lc_n\text{"}$$

<question element> building blocks are combinations of relations and entities (rule (7)). The non-terminal symbol <relation> is defined in terms of events and their related modifiers (rule (8)). The symbol <tbox:event type> is used to describe the values of a set $LE=\{le_1, le_2, \ldots, le_m\}$ of m event labels where $le_1$, for example, is the label of a concrete class E1 that is a subclass of EVENT. Events are optionally constrained using spatio-temporal attributes defined with the symbol <modifier> (rule (10)).

The non-terminal symbol <abox:location> corresponds to the labels of the set of entities defining the extension of the LOCATION entity class in the knowledge base. The non-terminal symbol <abox:date> corresponds to the labels of the set of entities defining the extension of the DATE entity class in the knowledge base. For example, if the question 23 is for events in 2002, all dates which are within the year 2002 are within the selected entity.

The non-terminal <abox:individual> of rule (9) is defined in a similar way, with the added constraint of allowing as fillers only the labels of the individuals that define the extension of the typed concept described by the symbol <tbox:label of concept> when the latter is present (e.g. "John H. Doe":Person).

B. Guidance Based on Collective Usage of the System

As noted above, through the grammar and the structure of the question 23 being edited, the system can help the user to incrementally add building blocks that correspond to a valid query. From this first guidance layer a list of available building blocks is produced. Given the flexibility of the query grammar, this list is potentially quite long and is not always useful in helping the user to build the question 23, other than to prevent the construction of an invalid query. The usage-based selection module 74 uses an analysis of queries generated in previous sessions of the system in order to rank the list of valid building blocks, according to the popularity of the query structure.

For example, each time a user submits a query 23, one or more patterns that were used in the query structure are stored in the session database 84. An example of stored query pattern could be "WHERE/Person/Event/Organization". As can be seen, the stored query structure does not match the exact query which may have been entered by the user (such as "Where did John Doe meet with ABC Co?"), but only the building blocks that the user selected. In this example, the three following patterns are stored: WHERE/Person, WHERE/Person/Event, and WHERE/Person/Event/Organization, corresponding to the order in which the blocks were assembled. These entries are later used to assist a user in further query generation. When a user creates a new query 23 starting with "WHERE" the usage-based selection module 74 of the system computes, from the session database 84, for each of the valid additional building blocks, the number of instances where that building block was used in combination with "WHERE." (Or, this information may be pre-computed and stored, for example, as a data structure, such as a table or matrix). From this computation, the list of valid building blocks can be sorted according to most frequent usage. The guidance module of the system can suggest an extension of the query 23 with one single query block. It can also suggest longer query extensions that are frequently used (based on the frequency of the patterns containing several blocks). This can greatly reduce the work required for creating the query 23. For example, if the user has already typed "WHO met" and a very frequent question pattern corresponds to looking for two people meeting in a location, then the system could immediately suggest extending the query to "WHO met PERSON in LOCATION". This process can be proposed at each step of selection of a new building block.

A next block may be suggested to the user in various ways. For example, a block may be suggested as the next block by highlighting the block, or by moving it into the editable space 22, or by showing an arrow or otherwise differentiating the proposed block from the other blocks. For example, in the query 23 shown in FIG. 2, the Date block 46 may be proposed to the user e.g., with an arrow 108, once the blocks WHO, Relation, and Character, are arranged in sequence, based on the pattern of blocks in the same sequence: (WHO/Relation/Character/Date), being highly ranked in the database. The user can, of course, ignore the suggestion, as long as there is at least one other selectable block (a block which has not been disabled and thus is available for selection) at the time.

Additional session information can be associated with each entry of the sessions database 84 in order to enable a more personalized ranking. These extra parameters may be for example, a user identifier and/or a project identifier. In this way the ranking can be based only on the entries associated with one value of these parameters or can be the result of a weighted sum of ranking using different values for the parameters. For example, the system could consider only entries from the sessions involving the current user or predefined team of users, or could weigh the sessions of the current user and the sessions from other users differently. These various options could be predefined according to the application domain or be accessible to the end user of the system so that he can control the behavior of the guidance mechanism according to the user's current search interest.

C. Guidance Based on the Content of the Document Collection

The collective usage and query structure mechanisms described above are used to ensure the validity of the question entered in terms of its structure and to suggest possible patterns according to the types of the blocks entered by other users. Another form of guidance which may be used in the exemplary method is based on the content of the document collection. To achieve this, an incremental process is followed by the content-based selection module 72, as described below.

Assuming that the user typically creates a question by gradually adding building blocks one by one, a query is launched in the knowledge base 80 after each new block addition. That query includes the contents of the building blocks that are in the question editing area 22 and the type of the last building block that the user added. In the case that there are some results returned by the query, the latest building block is allowed, otherwise it is not.

Once the user has dropped an editable building block in the question editing area 22, the user can input corresponding values e.g., the name of a person for a character block. The content-based guidance mechanism 72 renders the results returned by the query and presents, to the user, possible matches according to the characters already typed in.

For example, assume that the user has already added the following building blocks:
WHAT/"meeting" occurred in LOCATION/and
that the knowledge base contains two locations as follows:
1. "London", related to an individual value of the "meeting" entity in the knowledge base 80.
2. "Lyon", not related to an individual of the "meeting" entity in the knowledge base.

If the user starts typing "L" in the above location building block, the content-base guidance will display only "London" as a suggestion, since according to the existing building blocks, this is the only possible solution.

In this way, the content based selection component 72 system makes suggestions that lead the user to compose a question that is certain to return results.

This type of guidance mechanism 72 requires frequent access to the knowledge base 80 and should be able to retrieve possible suggestions quickly in order to be able to provide useful support to the user. In some cases, the system may wait until several letters have been typed to reduce the amount of searching required. In other cases, the content-based searching may be omitted. This may be the case, for example, if the knowledge base is particularly large. The benefit provided by the content-based filtering tends to decrease with the growing size of the knowledge base, since the likelihood of producing no results for a syntactically valid query in a large knowledge base 80 can be low. In this case the content-based selection mechanism 72 may be omitted or disconnected and the overall guidance is provided only by the structure and usage-based mechanisms 70, 74. However in the case of relatively small and very specific knowledge bases, mechanism 72 can work efficiently and provide particularly useful support to the user.

Parsing

The system 10 assumes that the document collection 90 has been parsed and each sentence indexed, based on the output 88 of the parser 92 (FIG. 5). The exemplary parser 92 annotates the text strings of the documents in corpus 90 with tags (labels) which correspond to grammar rules, such as lexical rules, syntactic rules, and dependency (semantic) rules. The lexical rules define relationships between words by the order in which they may occur or the spaces between them. Syntactic rules describe the grammatical relationships between the words, such as noun-verb, adjective-noun. Semantic rules include rules for extracting dependencies (subject-verb relationships, object-verb relationships), named entities and proper nouns, and co-reference links. The parser rules may be written in a suitable programming language, such as Python. The exemplary parser may be hosted by the computer 10, e.g., in memory 86, or located elsewhere, and its output 88 stored in the knowledge base.

In some embodiments, the parser 92 comprises an incremental parser, as described, for example, in above-referenced U.S. Pat. No. 7,058,567; Aït-Mokhtar, et al., "Incremental Finite-State Parsing," Proceedings of Applied Natural Language Processing, Washington, April 1997; and Aït-Mokhtar, et al., "Subject and Object Dependency Extraction Using Finite-State Transducers," Proceedings ACL '97 Workshop on Information Extraction and the Building of Lexical Semantic Resources for NLP Applications, Madrid, July 1997; Aït-Mokhtar, et al., "Robustness beyond shallowness: incremental deep parsing", Natural Language Engineering, 8, 2-3, pp. 121-144 (2002), Cambridge University Press. An exemplary parser of this type is the Xerox Incremental Parser (XIP), in which the output of one module can be used as the input of other modules.

Briefly, the parser 92 tokenizes each text string in the document corpus to form a sequence of tokens (words, numbers, punctuation, etc.) where a token is a sub-sequence of characters. Morphological rules assign parts of speech to each recognizable word token (indefinite article, noun, verb, etc). Ambiguous words may be semantically disambiguated using the method described in U.S. Pat. No. 6,405,162, incorporated herein by reference.

The parser 92 may include rules for extraction of entities, such as person names, organization names, and the like, which are tagged as such. The extraction of named entities may be performed with pre-compiled lists of entities (e.g., a list of person names, places etc.), which may be accessed from an online resource, such as WordNet™. Other entities, such as proper nouns, which serve the function of nouns in the text strings but which are not identified as common nouns, may also be extracted using contextual local grammar rules. Coreference rules may be used to tag appropriate pronouns, such as he, her, it, etc. with a tag corresponding to the referenced extracted entity. Word sense disambiguation for named entities and proper nouns may be performed using the methods described in one or more of U.S. Pub Nos. 2008/0319978, 2009/0089047 and 2009/0094019, the disclosures of which are incorporated herein by reference in their entireties.

The tagging and typing of temporal expressions (dates) may be performed using a method similar to that outlined in the TimeML standard for representing temporal expressions (see Saurí, R., Littman, J., Knippen, B., Gaizauskas, R., Setzer, A., Pustejovsky, J.: *TimeML Annotation Guidelines* (2006), available at www.timeml.org/site/) and as described in copending application Ser. No. 12/484,569, filed Jun. 15, 2009, entitled NATURAL LANGUAGE INTERFACE FOR COLLABORATIVE EVENT SCHEDULING, by Caroline Brun and Caroline Hagege, which is incorporated herein by reference in its entirety. In particular, temporal expressions may be resolved based on other information. For example, if an email dated May 14, 2010, indicates that a meeting took place on Monday, Monday can be resolved as Monday May $10^{th}$, i.e., the closest preceding Monday.

Events and Locations are also tagged. For example, XIP's event recognition module is used, including a named entity extraction sub-module that detects and "semantically" categorizes proper nouns related to events. Event detection, in the exemplary system, may be based on the approach described in Capet et al. (2008) where an event description is considered as "a predicate (verb, adjective and predicative noun) related to its arguments and modifiers". (see, Capet, P., Delevallade, T., Nakamura, T., Tarsitano, C., Sandor, A. and Voyatzi, S., "A Risk Assessment System with Automatic Extraction of Event Types", IIP, Beijing, China, 2008).

The approach described in (Capet et al. 2008) may be customized by adding specific predicates that evoke the event classes most relevant to the domain (e.g. the lemma "meet" evokes an individual of the "MEET" event class), while coreference and temporal expression normalization mechanisms (see, for example, the methods described in Hagege, C. and Tannier, X., "XTM: A robust temporal processor", CICLing, Haifa, Israel, 2008) may be further extended to account for specific time granularity (day) and support cross-document querying of time instants.

In addition to identifying and tagging relations between entities and events, the parser may assign some of the relations to specific relations classes, such as "is mentioned", "knows," "participated in," "said," "were together," "worked for" or other relations useful to the specific search. Each of these relations is linked to at least one entity, such as a person name, organization name, or event, which may be extracted from the same sentence, or more broadly, e.g., from the entire document.

Without intending to limit the scope of the exemplary embodiment, the following Example demonstrates the operation of a prototype system on a corpus of documents.

EXAMPLE

Collaborative Support for Litigation

A prototype building blocks-based search interface 1 has been evaluated which is suited to collaborative work of lawyers. The tested interface and supporting system 10 allow the user to construct simple WHs questions which can mention events, date, locations, named entities and a set of relations identified as being relevant for the litigation domain. Events and named entities were extracted from a collection of documents using the Xerox Incremental Parser described in Aït-Mokhtar, et al., "Robustness beyond shallowness: incremental deep parsing", Natural Language Engineering, 8, 2-3, pp. 121-144 (2002).

As a document collection 90, the TREC legal track collection was used (see D. W. Oard, B. Hedin, S. Tomlinson and J. R. Baron, "Overview of the TREC 2008 Legal Track". In Proc. 17th Text Retrieval Conf., TREC 2008, Gaithersburg, Md., USA, Nov. 18-21, 2008). Documents included in the collection were made public during various legal cases involving tobacco companies. One of the related issues these cases attempted to discover was whether cigarettes were sold to consumers by the defendant ("Company A"), with the misinterpretation, promoted by Company A, that they were not doing any harm, while Company A knew that they were. A sub-issue related to evidencing whether Company A denied that nicotine is addictive, while having the test results to show that it was. The present system would help the user to construct the case around these issues by supporting the search for information such as:

(1) what were the results of related tests?
(2) when were the results of various tests produced?
(3) which board and other meetings the senior researchers attended after the production of the tests?
(4) who else participated in those meetings?
(5) what did the publicity released by the company after the production of the tests said?

Figure 8:
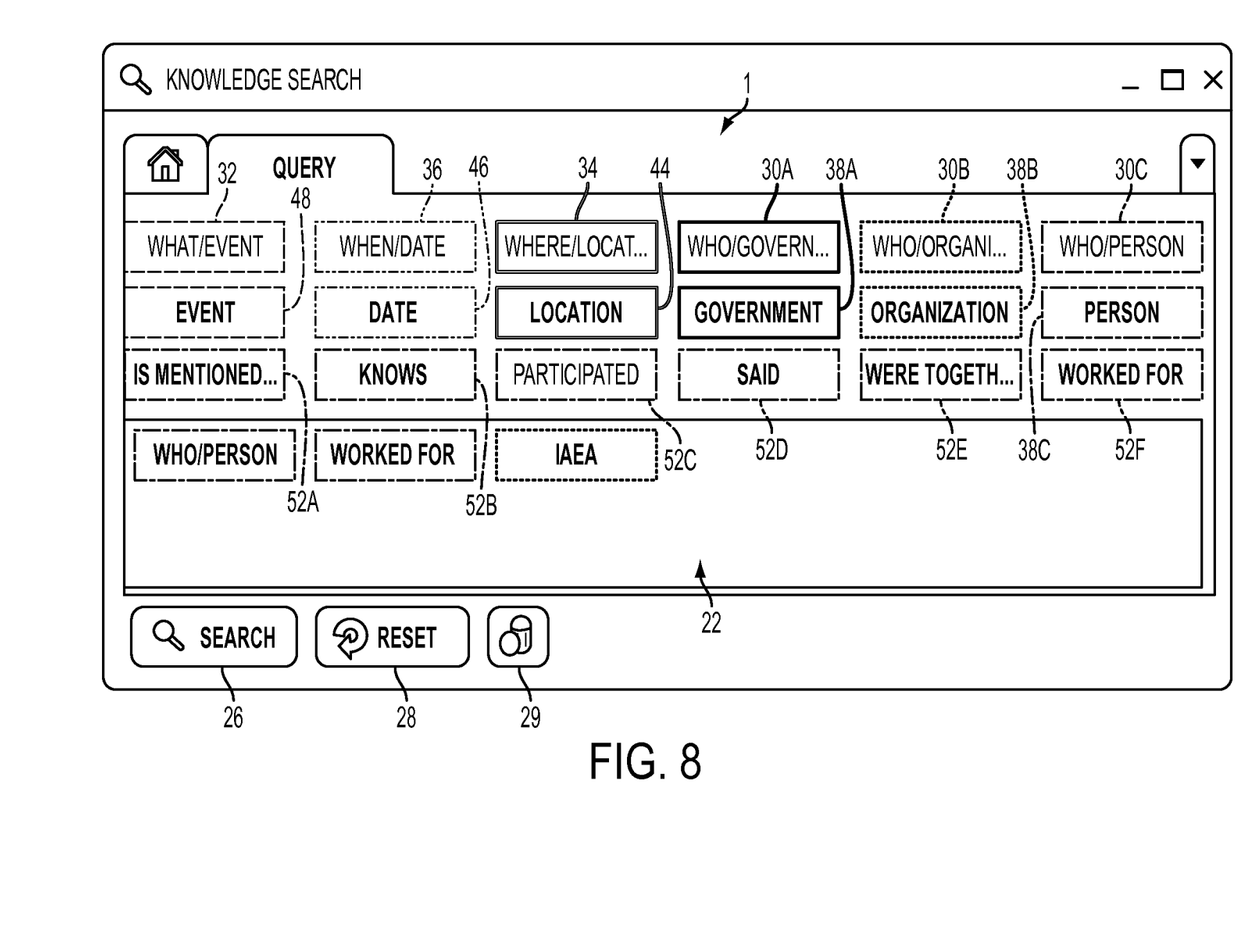
FIG. 8 illustrates one implementation of a query building interface.

FIG. 8 shows the exemplary search interface 1 of the prototype. It is similar to that shown in FIGS. 1 and 2, however, three WHO blocks were used: 30A, 30B, 30C, for government, organization, and person, respectively, which each have a respective entity composition block 38A, 38B, 38C. Here, the organization block 38B covers all organizations which are not government entities. The user is formulating the query: "Who are the persons who worked for IAEA?"

"Worked for" is one of a set of relations 52A, 52B, 52C, 52C, 52D, 52E, 52F that the users can select in the exemplary system and denotes a relation of work among two entities, e.g., a person and a company, as it has been detected by the parser in the collection of the documents 90.

The relations from which the user can choose are either directly corresponding to events extracted from the documents 90 or they are relations derived by specific modules of the parser. An example of such a module is one which extracts "is mentioned with" relations, which allows a user to search for two entities that are mentioned in the same document (i.e., the two entities are not required to be in the same sentence). Other examples of such relations are: "knows", "participated in" (participation of characters in events), "said" (what has been said by a character), and "were together" (detection of co-location of characters). In the example sentence, a number of semantically equivalent relations in the document collection are tagged with "worked for", such as "B was employed by A" and "A employed B", "B has worked for A" are tagged with "B" "worked for" "A".

This simplified system is capable of retrieving relevant documents, and parts thereof, which are responsive to the query 23.

The exemplary system and method provide graphical support to query formulation has advantages over existing query systems. First, it does not require a user to learn a set of expressions. Rather, the building blocks provide guidance during the construction of the query. The user does not need to know the rules by which the results are generated, although in some embodiments, this information could be displayed.

Nor is the system based on the selection only of predefined patterns. Rather it allows a dynamic composition of the questions, guided by three levels of analysis at the syntactic, content, and collaborative level.

The proposed interaction mechanism is directly applicable to the litigation domain and may be incorporated into a litigation support tool, such as Xerox's litigation support (XLS) service which provides for collection and storage of documents of a company which may be relevant to a particular litigation matter.

It will be appreciated that variants of the above-disclosed and other features and functions, or alternatives thereof, may be combined into many other different systems or applications. Various presently unforeseen or unanticipated alternatives, modifications, variations or improvements therein may be subsequently made by those skilled in the art which are also intended to be encompassed by the following claims.

A system and method for guiding a user in building a query are disclosed. The method includes providing an interaction space in which a user formulates a query using a plurality of query building blocks selected from a predefined set of query building blocks. The user's formulation of the query is guided. Guiding selection of at least a next building block is provided by at least one of a content-based mechanism which limits the selection of the next building block to those which will yield at least one result from an indexed collection of documents, a structure-based selection mechanism which limits the selection of the next building block to those which meet a predefined grammar, and a usage-based selection mechanism which proposes a next building block based on patterns of building blocks used in building prior queries. Each of these guidance mechanisms may be provided with the result that the next block proposed is informed by each of the mechanisms.

What is claimed is:

1. A method for guiding a user in building a query comprising:
    providing an interaction space in which a user formulates a query using a plurality of query building blocks selected from a predefined set of query building blocks, wherein selectable ones of the query building blocks are displayed in the interaction space;
    providing a content-based mechanism which limits the selection of the next building block to those which will yield at least one result from an indexed collection of documents, a structure-based selection mechanism which limits the selection of the next building block to those which meet a predefined grammar, and a usage-based selection mechanism which proposes a next building block based on patterns of building blocks used in building prior queries;
    with a processor, guiding the user's formulation of the query including, when at least one building block has been selected by the user for formulating the query, guiding selection of at least a next building block by at least one of:
        the content-based mechanism which limits the selection of the next building block to those which will yield at least one result from the indexed collection of documents,
        the structure-based selection mechanism which limits the selection of the next building block to those which meet the predefined grammar, and
        the usage-based selection mechanism which proposes the next building block based on patterns of building blocks used in building prior queries,
    wherein the interaction space includes a question editing area and wherein the method comprises providing for the user to move selected blocks into the question editing area in formulating the query.

2. A computer program product comprising a non-transitory recording medium encoding instructions, which when executed by a computer, perform a method comprising:
    providing an interaction space for a user to formulate a query using a plurality of query building blocks selected from a predefined set of query building blocks;
    contemporaneously displaying at least a subset of the query building blocks;
    receiving a user's selection of a result type building block from the displayed query building blocks into an editing area of the interaction space;
    after receiving the user's selection of the result type building block, guiding a user in formulating the query including, providing a content-based mechanism which limits selectable blocks to those which will yield at least one result from an indexed collection of documents, providing a structure-based selection mechanism which limits selectable blocks to those which meet a predefined grammar, and providing a usage-based selection mechanism which proposes a next building block based on patterns of building blocks used in building prior queries, whereby a natural language query is formulated from a sequence of the blocks including the result type block and is displayed in the editing area.

3. A method for guiding a user in building a query comprising:
    providing an interaction space in which a user formulates a query using a plurality of query building blocks selected from a predefined set of query building blocks, wherein selectable ones of the query building blocks are displayed in the interaction space;
    wherein the selected building blocks are displayed in a sequence in a question editing area of the interaction space, the method further comprising:
    providing for the user to start to build the query by selecting a first of the query building blocks, and moving it into the editing area;
    providing a content-based mechanism which limits the selection of the next building block to those which will yield at least one result from an indexed collection of documents, a structure-based selection mechanism which limits the selection of the next building block to those which meet a predefined grammar, and a usage-based selection mechanism which proposes a next building block based on patterns of building blocks used in building prior queries; and
    with a processor, guiding the user's formulation of the query including, when at least one building block has been selected by the user for formulating the query, guiding selection of at least a next building block by at least one of:
        the content-based mechanism which limits the selection of the next building block to those which will yield at least one result from the indexed collection of documents,
        the structure-based selection mechanism which limits the selection of the next building block to those which meet the predefined grammar, and
        the usage-based selection mechanism which proposes the next building block based on patterns of building blocks used in building prior queries.

* * * * *